US011794733B2

(12) United States Patent
Sakai et al.

(10) Patent No.: US 11,794,733 B2
(45) Date of Patent: Oct. 24, 2023

(54) RISK ESTIMATION DEVICE AND VEHICLE CONTROL DEVICE

(71) Applicant: Honda Motor Co., Ltd., Tokyo (JP)

(72) Inventors: Rei Sakai, Saitama (JP); Umiaki Matsubara, Saitama (JP); Tokitomo Ariyoshi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 389 days.

(21) Appl. No.: 17/094,822

(22) Filed: Nov. 11, 2020

(65) Prior Publication Data

US 2021/0139027 A1 May 13, 2021

(30) Foreign Application Priority Data

Nov. 12, 2019 (JP) .................................. 2019-204813

(51) Int. Cl.
*B60W 30/095* (2012.01)
*B60W 30/09* (2012.01)
(Continued)

(52) U.S. Cl.
CPC ........ *B60W 30/0956* (2013.01); *B60W 30/09* (2013.01); *B60W 40/04* (2013.01);
(Continued)

(58) Field of Classification Search
None
See application file for complete search history.

(56) References Cited

U.S. PATENT DOCUMENTS 11,099,564 B2 8/2021 Tsuchiya et al.
11,167,753 B2 11/2021 Ishioka
(Continued)

FOREIGN PATENT DOCUMENTS

CN 110121449 8/2019
CN 110239549 9/2019
(Continued)

OTHER PUBLICATIONS

Machine translation of JP2007-137085 (Year: 2023).*
(Continued)

*Primary Examiner* — Isaac G Smith
*Assistant Examiner* — Jennifer M Anda
(74) *Attorney, Agent, or Firm* — JCIPRNET (57) ABSTRACT

Provided is a risk estimation device capable of appropriately estimating a risk in a traveling direction of an own vehicle even under the condition that a relationship between a traffic participant and a road condition is inappropriate. The risk estimation device recognizes a traffic participant, a road condition, and a condition of the traffic participant in the traveling direction of the own vehicle based on a surrounding condition data, determines, by using a reference relationship model, whether the relationship between the traffic participant and the road condition is appropriate, estimates, by using a risk model, a traveling risk in a case where the relationship between the traffic participant and the road condition is determined to be appropriate, and estimates the traveling risk according to the condition of the traffic participant in a case where the relationship between the traffic participant and the road condition is determined to be inappropriate.

12 Claims, 8 Drawing Sheets

| Data No. | Traffic participant | Individual risk | Positional relationship word | Individual risk | Road condition | Individual risk | Combined risk |
|---|---|---|---|---|---|---|---|
| 1 | car | 1 | on | 1 | driveway | 2 | 2 |
| ⋮ | ⋮ | ⋮ | ⋮ | ⋮ | ⋮ | ⋮ | ⋮ |
| m | car | 1 | on | 1 | sidewalk | 2 | 2 |

(51) Int. Cl.
     *B60W 40/04*      (2006.01)
     *B60W 40/06*      (2012.01)

(52) U.S. Cl.
     CPC ..... *B60W 40/06* (2013.01); *B60W 2554/4041* (2020.02); *B60W 2554/4049* (2020.02)

(56) References Cited

U.S. PATENT DOCUMENTS

| | | | |
|---|---|---|---|
| 2017/0113685 A1* | 4/2017 | Sendhoff | G06N 7/01 |
| 2017/0323568 A1* | 11/2017 | Inoue | G08G 1/163 |
| 2018/0105174 A1* | 4/2018 | Russell | G05D 1/0214 |
| 2020/0346643 A1* | 11/2020 | Woon | B60W 60/00276 |
| 2020/0409374 A1* | 12/2020 | Dong | G08G 1/0129 |

FOREIGN PATENT DOCUMENTS

| | | | |
|---|---|---|---|
| JP | 2007137085 A | * | 6/2007 |
| JP | 2008071087 | | 3/2008 |
| JP | 2011257984 | | 12/2011 |
| JP | 2012148747 | | 8/2012 |
| JP | 2016091039 | | 5/2016 |
| JP | 2019168437 | | 10/2019 |

OTHER PUBLICATIONS

"Office Action of Japan Counterpart Application" with English translation thereof, dated May 31, 2022, p. 1-p. 7.
"Office Action of China Counterpart Application" with English translation thereof, dated Jul. 13, 2023, pp. 1-17.

* cited by examiner

| Road condition | Traffic participant |
|---|---|
| Roadway | Automobile, bicycle |
| Parking lot | Automobile, bicycle, pedestrian |
| Sidewalk, pedestrian crossing | Bicycle, pedestrian |
| Tram track | Tram |

| Traffic participant | Positional relationship word | Road condition |
|---|---|---|
| car | on | driveway |

FIG. 6

| Data No. | Traffic participant | Individual risk | Positional relationship word | Individual risk | Road condition | Individual risk | Combined risk |
|---|---|---|---|---|---|---|---|
| 1 | car | 1 | on | 1 | driveway | 2 | 2 |
| ... | ... | ... | ... | ... | ... | ... | ... |
| m | car | 1 | on | 1 | sidewalk | 2 | 2 |

RISK ESTIMATION DEVICE AND VEHICLE CONTROL DEVICE

CROSS-REFERENCE TO RELATED APPLICATION

This application claims the priority benefit of Japan application serial no. 2019-204813, filed on Nov. 12, 2019. The entirety of the above-mentioned patent application is hereby incorporated by reference herein and made a part of this specification.

BACKGROUND

Technical Field

The disclosure relates to a risk estimation device for estimating a risk according to a traffic environment in a traveling direction of an own vehicle.

Related Art

Conventionally, Patent Document 1 (Japanese Patent Application Laid-Open No. 2016-091039) discloses a risk estimation device for estimating a risk during vehicle operation. In this risk estimation device, the degree of risk during vehicle operation is estimated by using an observation logical formula or the like based on observation information such as the surrounding condition of an own vehicle.

In a real traffic environment, not only are there cases where the relationship between a traffic participant such as an automobile and the road condition (the road type or the like) in which the traffic participant is present is appropriate, but there are also cases where the relationship between the two is inappropriate. On the other hand, in the case of the risk estimation device of Patent Document 1, as the relationship between the traffic participant and the road condition is not assumed to be inappropriate, under such a condition, the risk in the traveling direction of the own vehicle cannot be appropriately estimated.

The disclosure provides a risk estimation device which can appropriately estimate the risk in the traveling direction of the own vehicle even under the condition in which the relationship between the traffic participant and the road condition is inappropriate.

SUMMARY

In an embodiment, a risk estimation device 10 according to claim 1 includes a surrounding condition data acquisition part, a recognition part, a reference relationship model storage part, a risk model storage part, a relationship determination part, and a risk estimation part. The surrounding condition data acquisition part (condition detection device 4) acquires a surrounding condition data D_info indicating a surrounding condition in a traveling direction of an own vehicle 3. The recognition part 11 (ECU2, STEP11) recognizes a traffic participant (automobile 7), a road condition (pedestrian crossing 8), and a condition of the traffic participant in the traveling direction of the own vehicle 3 based on the surrounding condition data D_info. The reference relationship model storage part (ECU2) stores a reference relationship model (FIG. 3) which defines a reference relationship between the traffic participant and the road condition. The risk model storage part (ECU2) stores a risk model (FIG. 7) which defines an association of a relationship between the traffic participant and the road condition with a risk in the traveling direction of the own vehicle. The relationship determination part 12 (ECU2, STEP12) determines whether the relationship between the traffic participant and the road condition is appropriate by using the reference relationship model in a case where the traffic participant and the road condition are recognized by the recognition part. The risk estimation part 13 (ECU2, STEP13 to STEP 16) estimates the risk (traveling risk R_risk) corresponding to the relationship between the traffic participant and the road condition by using the risk model in a case where it is determined by the relationship determination part that the relationship between the traffic participant and the road condition is appropriate, and estimates the risk (traveling risk R_risk) according to the condition of the traffic participant in a case where it is determined by the relationship determination part that the relationship between the traffic participant and the road condition is inappropriate.

Further, in an embodiment, a risk estimation device 10 according to claim 4 includes a surrounding condition data acquisition part, a recognition part, a reference relationship model storage part, a relationship determination part, a first risk estimation part, a second risk estimation part, and a risk calculation part. The surrounding condition data acquisition part (condition detection device 4) acquires a surrounding condition data D_info indicating a surrounding condition in a traveling direction of an own vehicle 3. The recognition part (ECU2, STEP31) recognizes a traffic participant (automobile 7), a road condition (pedestrian crossing 8), and a condition of the traffic participant in the traveling direction of the own vehicle 3 based on the surrounding condition data D_info. The reference relationship model storage part (ECU2) stores a reference relationship model (FIG. 3) which defines a reference relationship between the traffic participant and the road condition. The relationship determination part (ECU2, STEP32) determines whether a relationship between the traffic participant and the road condition is appropriate by using the reference relationship model in a case where the traffic participant and the road condition are recognized by the recognition part. The first risk estimation part (ECU2, STEP34, STEP39) estimates a first risk Risk1 in the traveling direction of the own vehicle 3 according to the relationship between the traffic participant and the road condition. The second risk estimation part (ECU2, STEP35, STEP40) estimates a second risk Risk2 in the traveling direction of the own vehicle 3 according to the condition of the traffic participant. The risk calculation part (ECU2, STEP37 to STEP38) calculates a risk (traveling risk R_risk) in the traveling direction of the own vehicle 3 by using a weighting calculation formula (5) including the first risk and the second risk as independent variables. In a case where it is determined by the relationship determination part that the relationship between the traffic participant and the road condition is inappropriate, the risk calculation part sets a weight for the second risk to a value larger than a weight for the first risk (STEP41).

DESCRIPTION OF THE EMBODIMENTS

In an embodiment, a risk estimation device 10 according to claim 1 includes a surrounding condition data acquisition part, a recognition part, a reference relationship model storage part, a risk model storage part, a relationship determination part, and a risk estimation part. The surrounding condition data acquisition part (condition detection device 4) acquires a surrounding condition data D_info indicating a surrounding condition in a traveling direction of an own vehicle 3. The recognition part 11 (ECU2, STEP11) recognizes a traffic participant (automobile 7), a road condition (pedestrian crossing 8), and a condition of the traffic participant in the traveling direction of the own vehicle 3 based on the surrounding condition data D_info. The reference relationship model storage part (ECU2) stores a reference relationship model (FIG. 3) which defines a reference relationship between the traffic participant and the road condition. The risk model storage part (ECU2) stores a risk model (FIG. 7) which defines an association of a relationship between the traffic participant and the road condition with a risk in the traveling direction of the own vehicle. The relationship determination part 12 (ECU2, STEP12) determines whether the relationship between the traffic participant and the road condition is appropriate by using the reference relationship model in a case where the traffic participant and the road condition are recognized by the recognition part. The risk estimation part 13 (ECU2, STEP13 to STEP 16) estimates the risk (traveling risk R_risk) corresponding to the relationship between the traffic participant and the road condition by using the risk model in a case where it is determined by the relationship determination part that the relationship between the traffic participant and the road condition is appropriate, and estimates the risk (traveling risk R_risk) according to the condition of the traffic participant in a case where it is determined by the relationship determination part that the relationship between the traffic participant and the road condition is inappropriate.

According to the risk estimation device, the surrounding condition data indicating the surrounding condition in the traveling direction of the own vehicle is acquired, and based on the surrounding condition data, the traffic participant, the road condition, and the condition of the traffic participant in the traveling direction of the own vehicle are recognized. When the traffic participant and the road condition are recognized by the recognition part, it is determined whether the relationship between the traffic participant and the road condition is appropriate by using a reference relationship model which defines a reference relationship between the traffic participant and the road condition. Then, when it is determined that the relationship between the traffic participant and the road condition is appropriate, the risk corresponding to the relationship between traffic participant and the road condition is estimated by using a risk model which defines the association of the relationship between the traffic participant and the road condition with the risk in the traveling direction of the own vehicle. On the other hand, when it is determined that the relationship between the traffic participant and the road condition is inappropriate, the risk is estimated according to the condition of the traffic participant.

In this case, the condition of the traffic participant may be regarded as appropriately indicating the risk of the traffic participant even under the condition that the relationship between the traffic participant and the road condition is inappropriate. Therefore, by estimating the risk in the traveling direction of the own vehicle according to such a condition of the traffic participant, even under the condition that the relationship between the traffic participant and the road condition is inappropriate, the risk in the traveling direction of the own vehicle can be appropriately estimated. (It is noted that the "traffic participant" in the specification includes a pedestrian, another vehicle, an obstacle, and the like. Further, in addition to the types of roads such as a sidewalk and a roadway, the "road condition" in the specification includes the types of road divisions such as a pedestrian crossing and the types of non-road surfaces such as a parking lot. Moreover, the "condition of the traffic participant" in the specification includes the result of estimating the intentions of a pedestrian, an automobile driver, etc.)

Further, in an embodiment, a risk estimation device 10 according to claim 4 includes a surrounding condition data acquisition part, a recognition part, a reference relationship model storage part, a relationship determination part, a first risk estimation part, a second risk estimation part, and a risk calculation part. The surrounding condition data acquisition part (condition detection device 4) acquires a surrounding condition data D_info indicating a surrounding condition in a traveling direction of an own vehicle 3. The recognition part (ECU2, STEP31) recognizes a traffic participant (automobile 7), a road condition (pedestrian crossing 8), and a condition of the traffic participant in the traveling direction of the own vehicle 3 based on the surrounding condition data D_info. The reference relationship model storage part (ECU2) stores a reference relationship model (FIG. 3) which defines a reference relationship between the traffic participant and the road condition. The relationship determination part (ECU2, STEP32) determines whether a relationship between the traffic participant and the road condition is appropriate by using the reference relationship model in a case where the traffic participant and the road condition are recognized by the recognition part. The first risk estimation part (ECU2, STEP34, STEP39) estimates a first risk Risk1 in the traveling direction of the own vehicle 3 according to the relationship between the traffic participant and the road condition. The second risk estimation part (ECU2, STEP35, STEP40) estimates a second risk Risk2 in the traveling direction of the own vehicle 3 according to the condition of the traffic participant. The risk calculation part (ECU2, STEP37 to STEP38) calculates a risk (traveling risk R_risk) in the traveling direction of the own vehicle 3 by using a weighting calculation formula (5) including the first risk and the second risk as independent variables. In a case where it is determined by the relationship determination part that the relationship between the traffic participant and the road condition is inappropriate, the risk calculation part sets a weight for the second risk to a value larger than a weight for the first risk (STEP41).

According to the risk estimation device, the surrounding condition data indicating the surrounding condition in the traveling direction of the own vehicle is acquired, and based on the surrounding condition data, the traffic participant, the road condition, and the condition of the traffic participant in the traveling direction of the own vehicle are recognized. When the traffic participant and the road condition are recognized by the recognition part, it is determined whether the relationship between the traffic participant and the road condition is appropriate by using a reference relationship model which defines a reference relationship between the traffic participant and the road condition. In addition, the first risk in the traveling direction of the own vehicle is estimated according to the relationship between the traffic participant and the road condition, and the second risk in the traveling direction of the own vehicle is estimated according to the condition of the traffic participant. Then, the risk in the traveling direction of the own vehicle is calculated by using a weighting calculation formula including the first risk and the second risk as independent variables.

At this time, when it is determined that the relationship between the traffic participant and the road condition is inappropriate, the weight for the second risk is set to a value larger than the weight for the first risk. As a result, it is possible to calculate the risk in the traveling direction of the own vehicle while reducing the degree of reflection of the relationship between the traffic participant and the road condition and at the same time increasing the degree of reflection of the condition of the traffic participant. As a result, the risk in the traveling direction of the own vehicle can be appropriately estimated even under the condition that the relationship between the traffic participant and the road condition is inappropriate.

In an embodiment, in the risk estimation device 10 according to claim 1 or 4, the relationship determination part determines that the relationship between the traffic participant and the road condition is inappropriate when the road condition is a pedestrian crossing 8 in a case where the traffic participant is an automobile 7.

According to the risk estimation device, when the road condition is a pedestrian crossing in the case where the traffic participant is an automobile, it is determined that the relationship between the traffic participant and the road condition is inappropriate. In a general traffic environment, the presence of an automobile on a pedestrian crossing may be regarded as an inappropriate relationship between the two. Therefore, according to the risk estimation device, such an inappropriate relationship can be reliably determined.

In an embodiment, in the risk estimation device 10 according to claim 2 or 5, the relationship determination part determines that the relationship between the traffic participant and the road condition is inappropriate in a case where a front-rear direction of the automobile 7 extends along an extending direction of the pedestrian crossing 8.

According to the risk estimation device, when the front-rear direction of the automobile extends along the extending direction of the pedestrian crossing, it is determined that the relationship between the traffic participant and the road condition is inappropriate. In a general traffic environment, the fact that the front-rear direction of the automobile extends along the extending direction of the pedestrian crossing may be regarded as an inappropriate relationship between the two and extremely inappropriate. Therefore, according to the risk estimation device, such an inappropriate relationship can be reliably determined. (It is noted that, in the specification, "the front-rear direction of the automobile extending along the extending direction of the pedestrian crossing" is not limited to the case where the front-rear direction of the automobile is parallel to the extending direction of the pedestrian crossing, but includes the case where the front-rear direction of the automobile is tilted by a predetermined angle (e.g., ±several degrees) with respect to the extending direction of the pedestrian crossing).

In an embodiment, a vehicle control device 1 includes the risk estimation device 10 according to any one of claims 1 to 6 and a control part. When the own vehicle 3 passes through a surrounding region of the traffic participant, in a case where the relationship between the traffic participant and the road condition is determined to be inappropriate, the control part (ECU2, STEP3) performs automatic operation control of the own vehicle 3 in a manner that a deceleration of the own vehicle 3 and a degree of avoidance with respect to the traffic participant are increased compared with a case where the relationship between the traffic participant and the road condition is determined to be appropriate.

In general, in the case where the relationship between the traffic participant and the road condition is determined to be inappropriate, it can be estimated that the risk of the own vehicle upon passing through the surrounding region of the traffic participant is high compared with the case where the relationship between the traffic participant and the road condition is determined to be appropriate. Therefore, according to the vehicle control device, as described above, in the case where it is estimated that the risk of the own vehicle upon passing through the surrounding region of the traffic participant is high, since the automatic operation control of the own vehicle is performed in a manner that the deceleration of the own vehicle and the degree of avoidance with respect to the traffic participant are increased, the safety during the automatic operation can be improved.

Hereinafter, a risk estimation device and a vehicle control device according to a first embodiment of the disclosure will be described with reference to the drawings. Since the vehicle control device of this embodiment also serves as a risk estimation device, in the following description, the vehicle control device will be described, and therein the function and the configuration of the risk estimation device will also be described.

Figure 1:
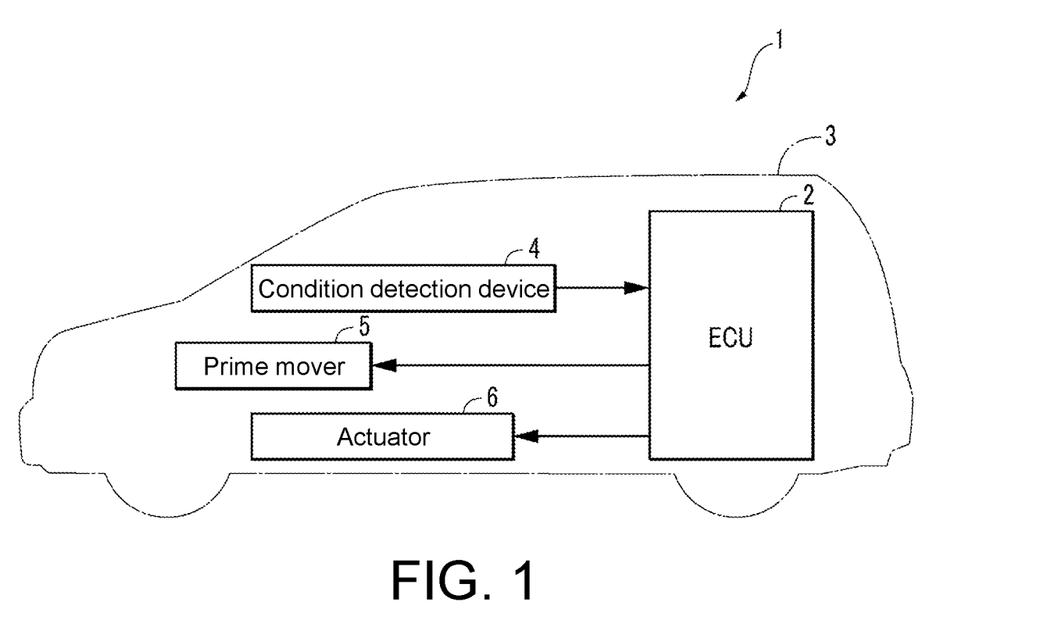
FIG. 1 is a view schematically showing a configuration of a risk estimation device and a vehicle control device according to an embodiment of the disclosure.

As shown in FIG. 1, a vehicle control device 1 is applied to a four-wheel-type automobile (hereinafter referred to as an "own vehicle") 3 and includes an ECU 2. A condition detection device 4, a prime mover 5, and an actuator 6 are electrically connected to the ECU 2.

The condition detection device 4 is configured by a camera, a millimeter-wave radar, a LIDAR, a sonar, a GPS, various sensors, etc. and outputs a surrounding condition data D_info indicating a current position of the own vehicle 3 and a surrounding condition (a traffic environment, a traffic participant, etc.) of the traveling direction of the own vehicle 3 to the ECU 2.

The surrounding condition data D_info is configured to include image data acquired by the camera and distance data measured by the LIDAR or the like. In this embodiment, the condition detection device 4 corresponds to a surrounding condition data acquisition part.

As will be described later, the ECU 2 recognizes the traffic environment around the own vehicle 3 based on the surrounding condition data D_info from the condition detection device 4 to calculate a traveling risk R_risk, and controls the traveling state of the own vehicle 3 according to the traveling risk R_risk and the like.

The prime mover 5 is configured by, for example, an electric motor or the like, and as will be described later, when a traveling path of the own vehicle 3 is determined, the output of the prime mover 5 is controlled by the ECU 2 in a manner that the own vehicle 3 travels in the traveling path.

Further, the actuator 6 is configured by a braking actuator, a steering actuator, etc., and as will be described later, when the traveling path of the own vehicle 3 is determined, the operation of the actuator 6 is controlled by the ECU 2 in a manner that the own vehicle 3 travels in the traveling path.

On the other hand, the ECU 2 is configured by a microcomputer composed of a CPU, a RAM, a ROM, an E2PROM, an I/O interface, various electric circuits (none of which are shown), etc. As will be described below, the ECU 2 performs a calculation process of the traveling risk R_risk and the like based on the surrounding condition data D_info and the like from the condition detection device 4 described above. In this embodiment, the ECU 2 corresponds to a recognition part, a reference relationship model storage part, a risk model storage part, a relationship determination part, a risk estimation part, and a control part.

Next, the configuration of a risk estimation device 10 in the vehicle control device 1 will be described with reference to FIG. 2. As will be described below, the risk estimation device 10 estimates (calculates) the traveling risk R_risk, which is the risk of the traveling direction in which the own vehicle 3 is traveling, according to the surrounding condition data D_info.

In the risk estimation device 10, the traveling risk R_risk is calculated as an integer value in the range of values of 1 to 3 by a method to be described below. In that case, the traveling risk R_risk is set to indicate that the larger the value, the higher the risk in the traveling direction of the own vehicle 3.

Figure 2:
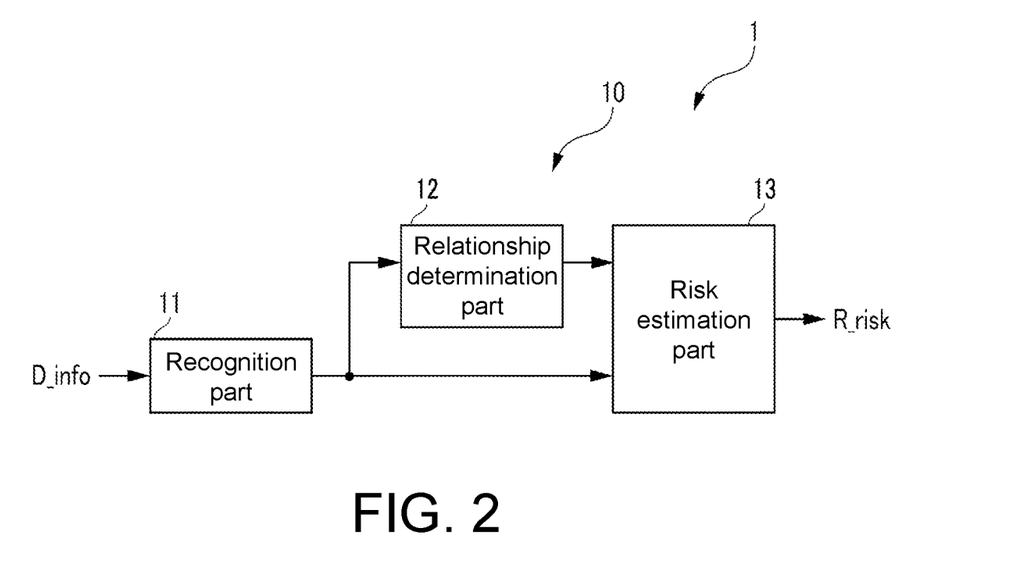
FIG. 2 is a block diagram showing a functional configuration of the risk estimation device.

As shown in FIG. 2, the risk estimation device 10 includes a recognition part 11, a relationship determination part 12, and a risk estimation part 13, and specifically, these elements 11 to 13 are configured by the ECU 2.

Based on the image data included in the surrounding condition data D_info, the recognition part 11 recognizes a traffic participant, a road condition, a condition of the traffic participant, etc. which are present within a predetermined range (e.g., tens of meters) of the traveling direction of the own vehicle 3 according to a predetermined image recognition method (e.g., a deep learning method). In addition, the positional relationship between the traffic participant and the road condition is recognized.

In this case, a bicycle, a pedestrian, an automobile, or the like is recognized as the traffic participant. In addition, a roadway, a sidewalk, a pedestrian crossing, or the like is recognized as the road condition. Furthermore, if the traffic participant is an automobile, then turn-off of the brake lamp, blinking of the blinker, blinking of the hazard lamp, opening/closing of the door, or the like is recognized as the condition of the traffic participant.

As described above, the recognition part 11 recognizes the traffic participant, the road condition, the condition of the traffic participant, the relationship between the traffic participant and the road condition, etc. present in the traveling direction of the own vehicle 3. Then, the recognition results thereof are outputted from the recognition part 11 to the relationship determination part 12 and the risk estimation part 13.

Further, when the above recognition results are inputted from the recognition part 11, the relationship determination part 12 determines whether the relationship between the traffic participant and the road condition in which the traffic participant is present is appropriate. In that case, excluding the case where the automobile is the traffic participant and the pedestrian crossing at the intersection is the road condition, the determination is performed as described below.

Figure 3:
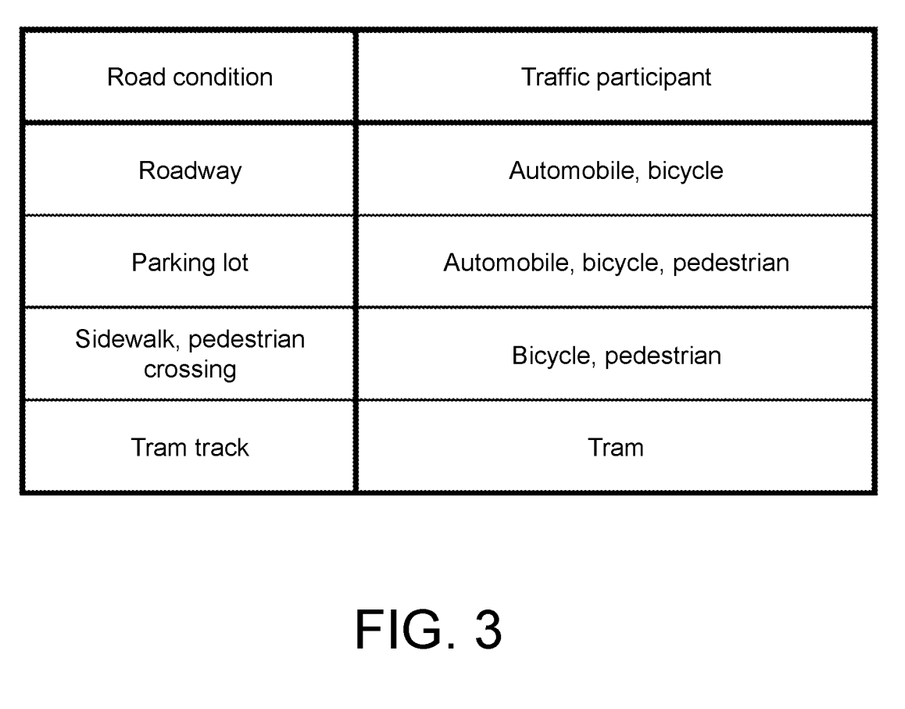
FIG. 3 is a view showing a map used for determination in the relationship determination part.

That is, when the combination of the traffic participant and the road condition matches the combination described in the map shown in FIG. 3, the relationship between the two is determined to be appropriate, and in other cases, it is determined to be inappropriate.

On the other hand, in the case where the automobile is the traffic participant and the pedestrian crossing at the intersection is the road condition, in addition to the match/mismatch with the combination of the map shown in FIG. 3, whether the relationship between the two is appropriate is determined based on the condition whether the front-rear direction of the automobile extends along the extending direction of the pedestrian crossing.

Figure 4:
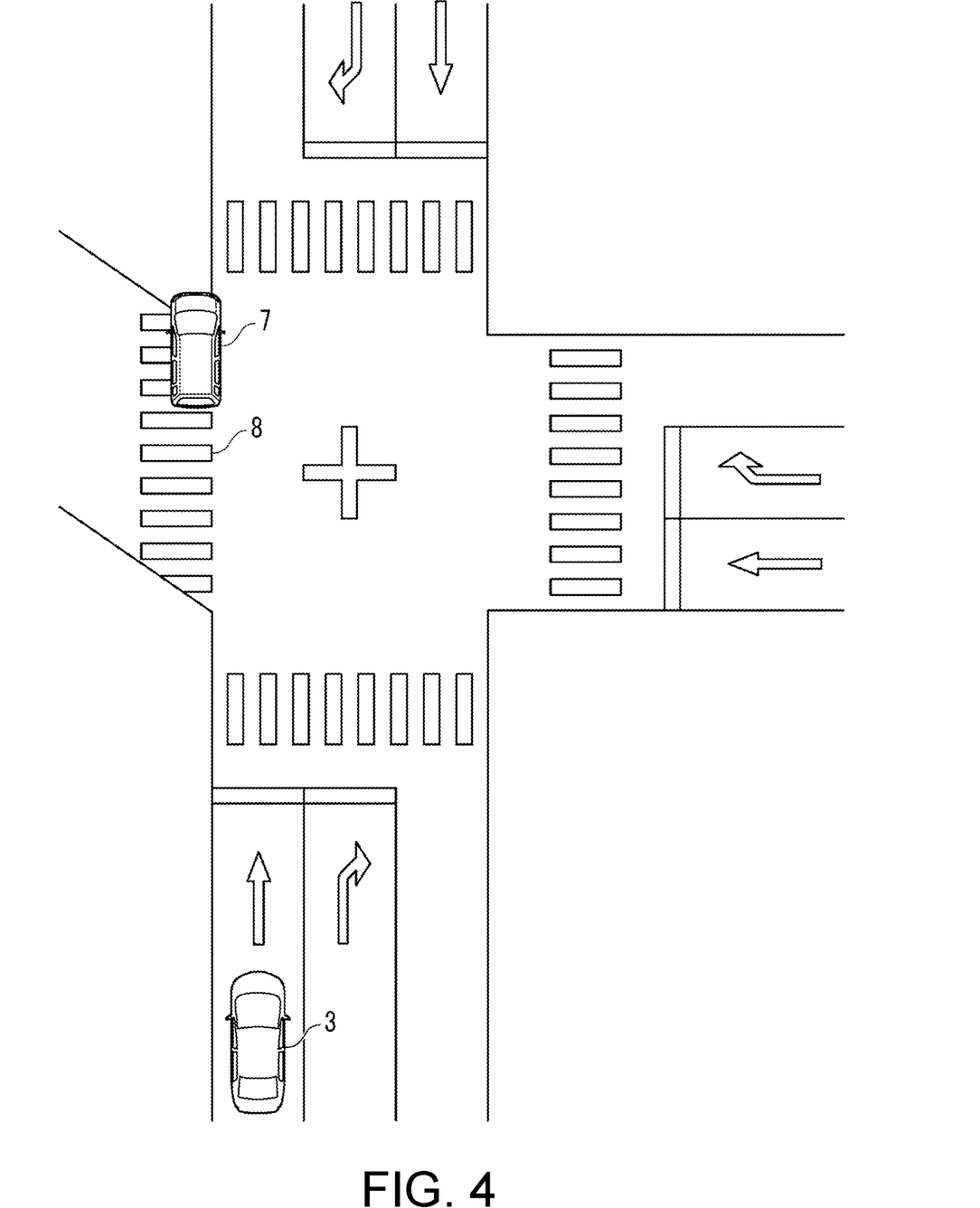
FIG. 4 is a plan view showing a state in which another vehicle is stopped at a pedestrian crossing in front of an own vehicle.
Figure 5:
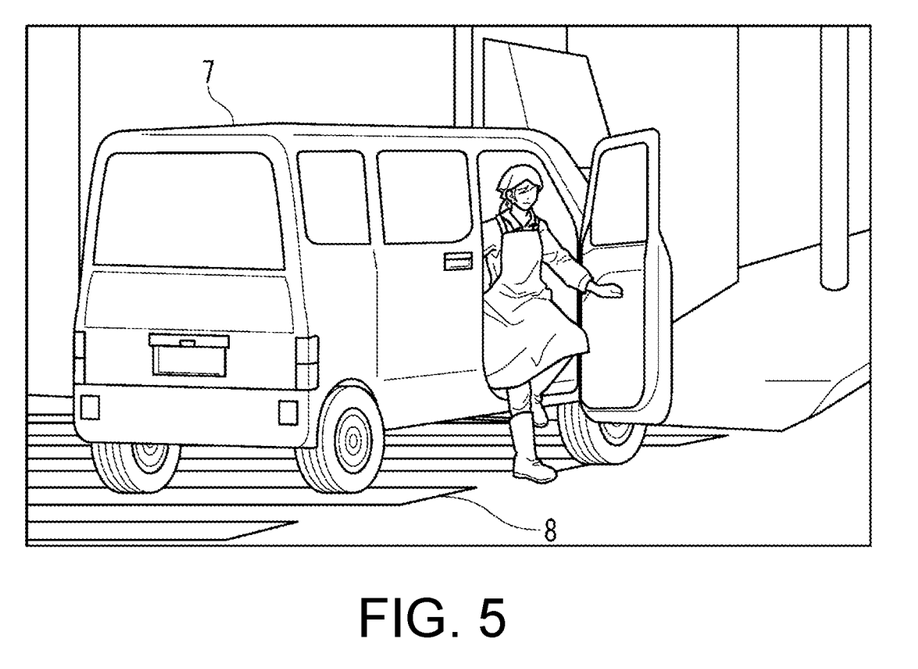
FIG. 5 is a perspective view showing the stopped vehicle of FIG. 4 and its surroundings.

In other words, as shown in FIG. 4 and FIG. 5, in the case where an automobile 7 is located (stopped) on a pedestrian crossing 8 at an intersection, when the front-rear direction of the automobile 7 extends along the extending direction of the pedestrian crossing 8, the relationship between the two is determined to be inappropriate, and in other cases, the relationship between the two is determined to be appropriate.

Since the state in which the automobile 7 is located on the pedestrian crossing 8 at the intersection may occur due to traffic light waiting, a traffic jam, etc., the above is to avoid confusion with such a state and to determine that the relationship between the two is unmistakenly in an inappropriate state.

In addition, when the automobile is the traffic participant and the pedestrian crossing at the intersection is the road condition, whether the relationship between the traffic participant and the road condition is appropriate may also be determined based only on the match/mismatch with the combination described in the map shown in FIG. 3.

Further, when the recognition results from the recognition part 11 and the determination result from the relationship determination part 12 are respectively inputted, as described below, the risk estimation part 13 calculates the traveling risk R_risk based on whether the relationship between the traffic participant and the road condition is appropriate.

First, when the relationship between the traffic participant and the road condition is inappropriate, a first temporary risk Risk_tmp1 is calculated by Equations (1) and (2) below.

$$\text{Risk\_tmp1} = (\text{Risk\_A} \times KA) \times (\text{Risk\_B} \times KB) \times \text{Risk\_CND} \tag{1}$$

$$\text{Risk\_CND} = (\text{Risk\_C} \times KC) \times (\text{Risk\_D} \times KD) \times \ldots \times (\text{Risk\_X} \times KX) \tag{2}$$

Risk_A in Equation (1) above represents an individual risk corresponding to the traffic participant, and KA is a predetermined multiplication coefficient set in advance. Moreover, Risk_B represents an individual risk corresponding to a positional relationship word, and KB is a predetermined multiplication coefficient set in advance. Further, Risk_CND of Equation (1) is a condition risk corresponding to the condition of the traffic participant and is defined as Equation (2).

In Equation (2), Risk_C represents an individual risk corresponding to the road condition, and in this case, is set to the highest value (e.g., a value of 3). Moreover, KC is a predetermined multiplication coefficient set in advance. Further, Risk_D to Risk_X are respectively various condition risks corresponding to various conditions of the traffic participant, and KD to KX are predetermined multiplication coefficients set in advance.

In this case, when the traffic participant is the automobile 7, turn-off/turn-on of the brake lamp, blinking/stop of the start-off side blinker, opening/closing of the door, etc. are taken as the various conditions of the traffic participant, and the values of the condition risks Risk_D to Risk_X are set according to the various conditions of the traffic participant.

More specifically, when the brake lamp is off, compared with when the brake lamp is on, due to the high probability that the automobile 7 will start off, the condition risk is set to a higher value. For the same reason, when the start-off side blinker is blinking, the condition risk is set to a higher value than when the start-off side blinker is stopped. Further, when the door of the automobile 7 is open (see FIG. 5), compared with when the door of the automobile 7 is closed, due to the high probability that the occupant will jump out of the automobile 7, the condition risk is set to a higher value.

As described above, the first temporary risk Risk_tmp1 is calculated by Equations (1) and (2) above, and a temporary risk Risk_tmp is calculated by converting this calculation result into an integer by a predetermined method (e.g., a rounding method). In this case, when the automobile 7 is in the state shown in FIG. 4 and FIG. 5, the temporary risk Risk_tmp is calculated as a value of 3. Then, the temporary risk Risk_tmp is set as the traveling risk R_risk.

Figure 6:
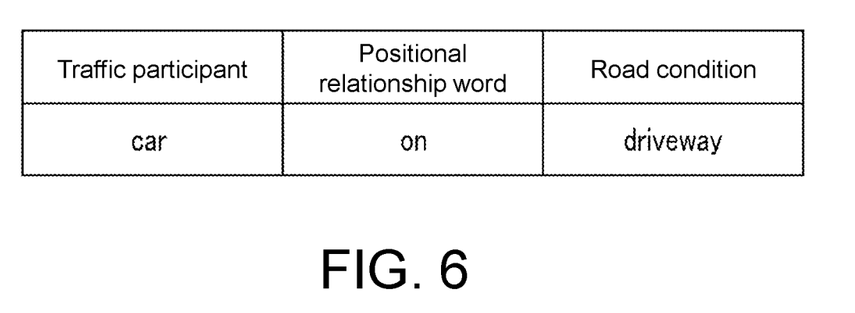
FIG. 6 is a view showing an example of a scene data.

On the other hand, when the relationship between the traffic participant and the road condition is appropriate, a scene data as shown in FIG. 6 is created. This scene data is an example of the case where an automobile, which is the traffic participant, is located on a roadway, which is the road condition, and is created as a data in which the traffic participant "car", the positional relationship word "on" of the traffic participant with respect to the road condition, and the road condition "driveway" are associated with each other.

Then, the temporary risk Risk_tmp is calculated based on this scene data. Specifically, by referring to a risk map of FIG. 7 based on the scene data, a combined risk where the scene data matches is calculated, and this is set as the temporary risk Risk_tmp. For example, in the case of the scene data shown in FIG. 6, the combined risk is calculated as a value of 2. Finally, the traveling risk R_risk is set to the temporary risk Risk_tmp.

In the risk estimation device 10, the traveling risk R_risk is calculated as an integer value in the range of values of 1 to 3 by the above method.

Next, an automatic operation control process performed by the vehicle control device 1 of this embodiment will be described with reference to FIG. 8 and FIG. 9. The automatic operation control process calculates the traveling risk R_risk as described below and performs automatic operation control of the own vehicle 3 according to the traveling risk R_risk, and is performed by the ECU 2 at a predetermined control cycle. It is assumed that various values calculated in the description below are stored in the E2PROM of the ECU 2.

Figure 8:
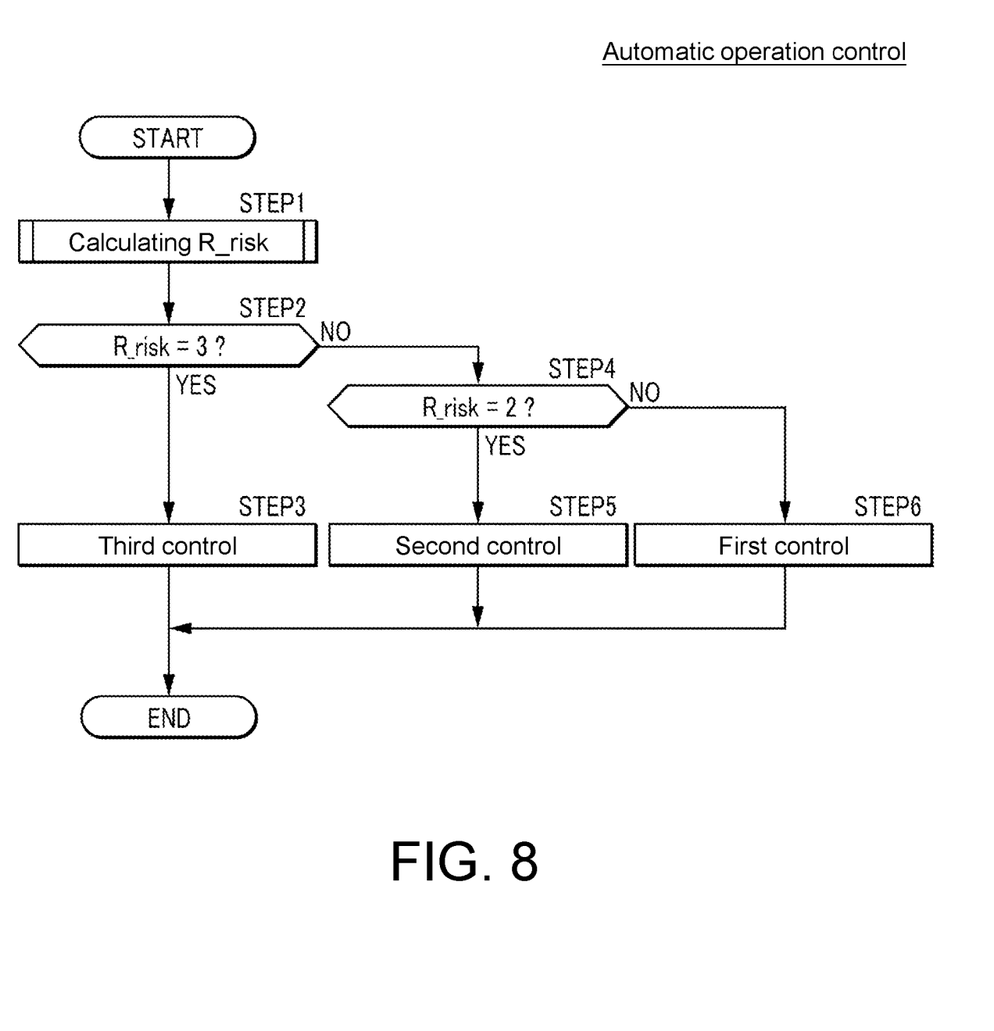
FIG. 8 is a flowchart showing an automatic operation control process.

As shown in FIG. 8, first, the traveling risk R_risk is calculated (FIG. 8/STEP1). Specifically, the calculation process of the traveling risk R_risk is performed as shown in FIG. 9.

Figure 9:
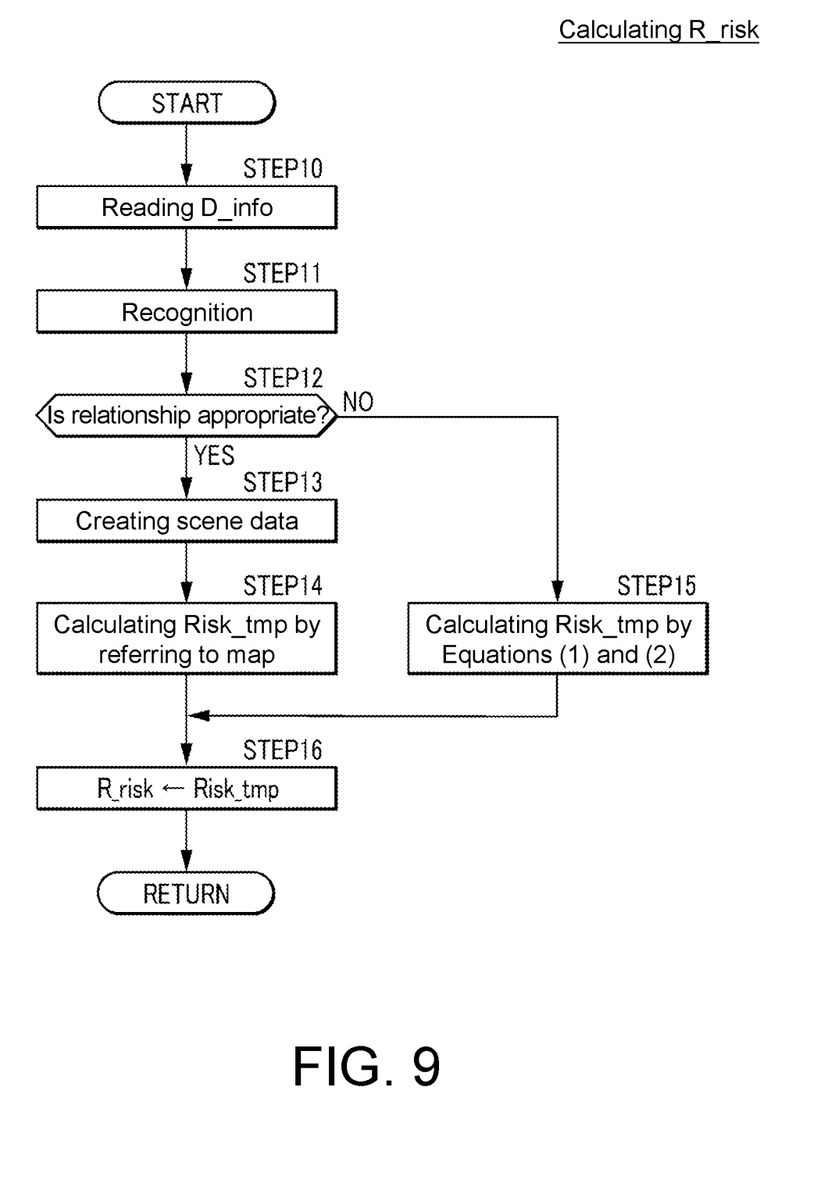
FIG. 9 is a flowchart showing a calculation process of a traveling risk R_risk.

As shown in FIG. 9, first, the surrounding condition data D_info is read (FIG. 9/STEP10).

Next, a recognition process is performed (FIG. 9/STEP11). By the same method as of the recognition part 11 described above, in this recognition process, the traffic participant, the road condition, the condition of the traffic participant, and the relationship between the traffic participant and the road condition present in the traveling direction of the own vehicle 3 are recognized.

Afterwards, based on the relationship between the traffic participant and the road condition, it is determined whether the relationship between the traffic participant and the road condition is appropriate (FIG. 9/STEP12).

When the determination is affirmative (FIG. 9/STEP12 . . . YES) and the relationship between the traffic participant and the road condition is appropriate, the above-mentioned scene data is created (FIG. 9/STEP13).

Figure 7:
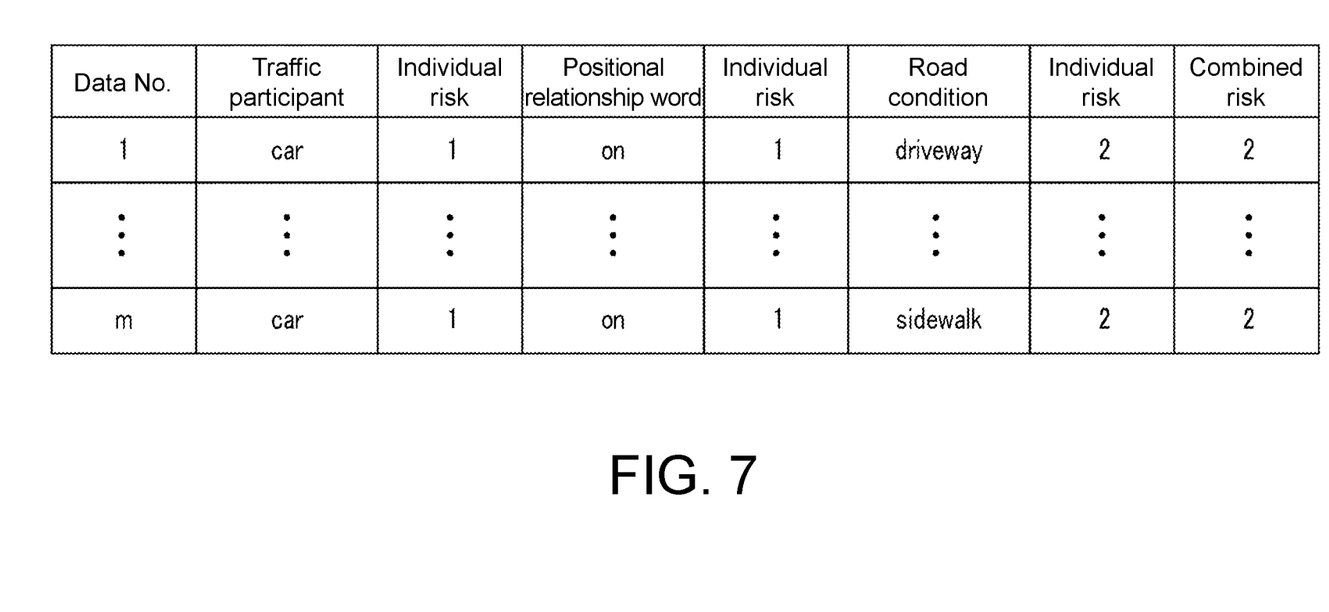
FIG. 7 is a view showing an example of a risk map.

Next, the temporary risk Risk_tmp is calculated by referring to the risk map of FIG. 7 described above based on the scene data (FIG. 9/STEP14). Specifically, the combined risk where the scene data matches is calculated as the temporary risk Risk_tmp.

On the other hand, when the above determination is negative (FIG. 9/STEP12 . . . NO) and the relationship between the traffic participant and the road condition is inappropriate, the first temporary risk Risk_tmp1 is calculated by Equations (1) and (2) above, and the calculation result is converted into an integer to calculate the temporary risk Risk_tmp (FIG. 9/STEP15).

Then, as described above, the temporary risk Risk_tmp is set as the traveling risk R_risk (FIG. 9/STEP16), and this process is ended.

Returning to FIG. 8, after calculating the traveling risk R_risk as described above, it is determined whether R_risk=3 (FIG. 8/STEP2). When the determination is affirmative (FIG. 8/STEP2 . . . YES) and R_risk=3, a third control process is performed (FIG. 8/STEP3).

Specifically, the third control process is performed as follows. First, based on the traveling risk R_risk and the surrounding condition data D_info, a future traveling path of the own vehicle 3 is calculated as a time-series data of a two-dimensional coordinate system by a predetermined calculation algorithm. Next, the prime mover 5 and the actuator 6 are controlled in a manner that the own vehicle 3 travels in the traveling path.

As a result, for example, in the traffic environment shown in FIG. 4 and FIG. 5, the own vehicle 3, while decelerating, changes the traveling line toward the center lane and travels so as to avoid the automobile 7. At this time, the traveling state of the own vehicle 3 is controlled in a manner that, compared with the case of a second control process and a first control process to be described later, the degree of deceleration and the degree of change of the traveling line are larger. After performing the third control process as described above, this process is ended.

On the other hand, when the above determination is negative (FIG. 8/STEP2 . . . NO) and R_risk≠3, it is determined whether R_risk=2 (FIG. 8/STEP4). When this determination is affirmative (FIG. 8/STEP4 . . . YES) and R_risk=2, the second control process is performed (FIG. 8/STEP5).

In the second control process, the future traveling path of the own vehicle 3 is calculated by the same method as in the third control process described above, and the prime mover 5 and the actuator 6 are controlled in a manner that the own vehicle 3 travels in the traveling path. As a result, the own vehicle 3, while decelerating, changes the traveling line toward the center lane and travels so as to avoid the traffic participant. At this time, the traveling state of the own vehicle 3 is controlled in a manner that, compared with the case of the third control process described above, the degree of deceleration and the degree of change of the traveling line are smaller. After performing the second control process as described above, this process is ended.

On the other hand, when the above determination is negative (FIG. 8/STEP4 . . . NO) and R_risk=1, the first control process is performed (FIG. 8/STEP6). In the first control process, the future traveling path of the own vehicle 3 is calculated by the same method as in the third control process described above, and the prime mover 5 and the actuator 6 are controlled in a manner that the own vehicle 3 travels in the traveling path. As a result, the traveling state of the own vehicle 3 is controlled in a manner of maintaining the vehicle speed and the traveling line. After performing the first control process as described above, this process is ended.

As described above, according to the risk estimation device 10 of the vehicle control device 1 of the first embodiment, the surrounding condition data D_info indicating the surrounding condition in the traveling direction of the own vehicle 3 is acquired, and based on the surrounding condition data D_info, the traffic participant, the road condition, and the condition of the traffic participant in the traveling direction of the own vehicle 3 are recognized. Further, by referring to the map of FIG. 3 based on the traffic participant and the road condition, it is determined whether the relationship between the traffic participant and the road condition is appropriate.

Then, when it is determined that the relationship between the traffic participant and the road condition is appropriate, the scene data of FIG. 6 is created, and the traveling risk R_risk is calculated by referring to the risk map of FIG. 7 according to the scene data. On the other hand, when it is determined that the relationship between the traffic participant and the road condition is inappropriate, the first temporary risk Risk_tmp1 is calculated by Equations (1) and (2) above, and the calculation result is converted into an integer to calculate the traveling risk R_risk.

Equations (1) and (2) include the condition risks Risk_D to Risk_X set according to various conditions of the traffic participant, and the various conditions of the traffic participant may be regarded as appropriately indicating the risk of the traffic participant even under the condition that the relationship between the traffic participant and the road condition is inappropriate. Therefore, by using Equations (1) and (2) which include such condition risks Risk_D to Risk_X, even under the condition that the relationship between the traffic participant and the road condition is inappropriate, the traveling risk R_risk in the traveling direction of the own vehicle 3 can be appropriately calculated/estimated.

Further, in the case where the traffic participant is the automobile 7 and the road condition is the pedestrian crossing 8, when the front-rear direction of the automobile 7 extends along the extending direction of the pedestrian crossing 8, it is determined that the relationship between the traffic participant and the road condition is inappropriate. In a general traffic environment, the fact that the front-rear direction of the automobile 7 extends along the extending direction of the pedestrian crossing 8 is not appropriate as the relationship between the two, and may be regarded as extremely inappropriate. Therefore, according to the risk estimation device 10, such an inappropriate relationship can be reliably determined.

Moreover, when it is determined that the relationship between the traffic participant and the road condition is inappropriate, the traveling risk R_risk is set to the highest value of 3. As a result, in the automatic operation control process of FIG. 8, compared with the case where the traveling risk R_risk=1 and 2, i.e., where the relationship between the traffic participant and the road condition is determined to be appropriate, since the operation state of the own vehicle 3 is controlled in a manner that the deceleration of the own vehicle 3 and the degree of avoidance with respect to the traffic participant are increased, the safety during automatic operation can be improved.

While the first embodiment is an example in which the relationship between the traffic participant and the road condition is inappropriate in the case where the traffic participant is an automobile and the road condition is a pedestrian crossing, the case where the relationship between the traffic participant and the road condition of the disclosure is inappropriate is not limited thereto. For example, the traffic participant may be a bicycle or a pedestrian, and the road condition may be a highway or an automobile-only road. Further, the traffic participant may be an automobile, a bicycle, or a pedestrian, and the road condition may be a tram track.

In addition, while the first embodiment is an example in which the map shown in FIG. 3 is used as the reference relationship model, the reference relationship model of the disclosure is not limited thereto and may be any one that defines a reference relationship between the traffic participant and the road condition. For example, as the reference relationship model, a map or a table different from that shown in FIG. 3 may be used, a map which defines a state in which the traffic participant and the road condition are in an inappropriate relationship may be used, or a mathematical formula may be used.

Further, while the first embodiment is an example in which the risk map of FIG. 7 is used as the risk model, the risk model of the disclosure is not limited thereto and may be any one that defines the association of the relationship between the traffic participant and the road condition with the risk in the traveling direction of the own vehicle. For example, as the risk model, a map or a table different from the risk map of FIG. 7 may be used, or a mathematical formula may be used.

On the other hand, while the first embodiment is an example in which the risk estimation part 13 calculates the risk by Equations (1) and (2) when it is determined that the relationship between the traffic participant and the road condition is inappropriate, the risk estimation part of the disclosure is not limited thereto and may be any one that estimates the risk in the traveling direction of the own vehicle according to the condition of the traffic participant. For example, one that estimates the risk by map search according to the condition of the traffic participant may be used as the risk estimation part.

Next, an vehicle control device according to a second embodiment will be described. In the case of this vehicle control device, compared with the vehicle control device 1 of the first embodiment, only the configuration of the calculation process of the above traveling risk R_risk is different, and hereinafter, the calculation process of the traveling risk R_risk of the second embodiment will be described with reference to FIG. 10.

In this embodiment, the ECU 2 corresponds to a recognition part, a reference relationship model storage part, a relationship determination part, a first risk estimation part, a second risk estimation part, a risk calculation part, and a control part.

Figure 10:
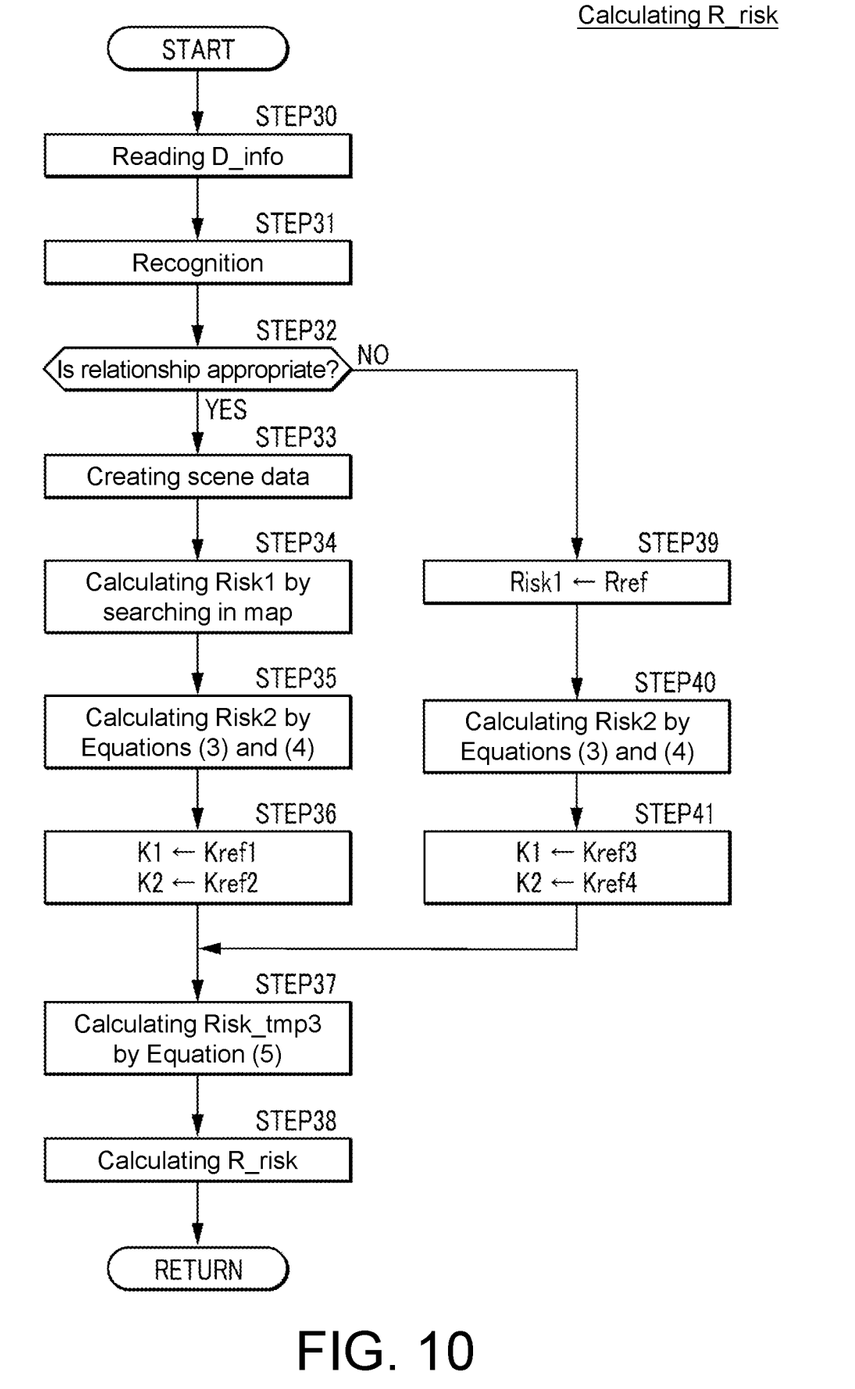
FIG. 10 is a flowchart showing a calculation process of the traveling risk R_risk according to a second embodiment.

In the case of FIG. 10, STEP30 to STEP32 have the same configuration as STEP10 to STEP12 of FIG. 9 described above, and thus the descriptions thereof will be omitted.

When the determination in STEP32 is affirmative and the relationship between the traffic participant and the road condition is appropriate, the above-mentioned scene data is created (FIG. 10/STEP33).

Next, a first risk Risk1 is calculated by referring to the risk map of FIG. 7 described above (FIG. 10/STEP34). Specifically, by referring to the risk map of FIG. 7 based on the scene data, the combined risk where the scene data matches is calculated as the first risk Risk1.

Afterwards, a second risk Risk2 is calculated by Equations (3) and (4) below (FIG. 10/STEP35).

$$\text{Risk2}=(\text{Risk}\_A\times KA)\times(\text{Risk}\_B\times KB)\times\text{Risk}\_\text{CND} \quad (3)$$

$$\text{Risk}\_\text{CND}=(\text{Risk}\_C\times KC)\times(\text{Risk}\_D\times KD)\times\ldots\times(\text{Risk}\_X\times KX) \quad (4)$$

Equations (3) and (4) correspond to those in which the first temporary risk Risk_tmp1 of Equations (1) and (2) above is replaced with the second risk Risk2.

Next, a first weighting coefficient K1 is set to a first predetermined value Kref1 and a second weighting coefficient K2 is set to a second predetermined value Kref2 (FIG. 10/STEP36). The first predetermined value Kref1 and the second predetermined value Kref2 are positive predetermined values in which Kref1≥Kref2 is satisfied.

Then, a third temporary risk Risk_tmp3 is calculated by Equation (5) below (FIG. 10/STEP37).

$$\text{Risk}\_tmp3=K1\times\text{Risk}1+K2\times\text{Risk}2 \quad (5)$$

Next, the third temporary risk Risk_tmp3 is converted into an integer to calculate the traveling risk R_risk (FIG. 10/STEP38). After that, this process is ended.

On the other hand, when the determination of STEP32 is negative and the relationship between the traffic participant and the road condition is inappropriate (for example, when the relationship is as shown in FIG. 4 and FIG. 5), the first risk Risk1 is set to a predetermined value Rref (e.g., a value of 3) (FIG. 10/STEP39).

Next, the second risk Risk2 is calculated by Equations (3) and (4) above (FIG. 10/STEP40).

After that, the first weighting coefficient K1 is set to a third predetermined value Kref3, and the second weighting coefficient K2 is set to a fourth predetermined value Kref4 (FIG. 10/STEP41). The third predetermined value Kref3 and the fourth predetermined value Kref4 are positive predetermined values in which Kref3<Kref4 or Kref3<<Kref4 is satisfied.

Then, the third temporary risk Risk_tmp3 and the traveling risk R_risk are calculated as described above (FIG. 10/STEP37, STEP38). After that, this process is ended.

In the calculation process of FIG. 10, the traveling risk R_risk is calculated as an integer value in the range of values of 1 to 3 by the above method.

As described above, according to the risk estimation device of the second embodiment, the third temporary risk Risk_tmp3 is calculated by using the weighting calculation formula (5) including the first risk Risk1 and the second risk Risk2 as independent variables, and the result is converted into an integer to calculate the traveling risk R_risk.

At this time, when it is determined that the relationship between the traffic participant and the road condition is inappropriate (for example, in the case of the relationship as shown in FIG. 4 and FIG. 5), the second weighting coefficient K2 multiplied by the second risk Risk2 is set to the value Kref4 which is larger than the first weighting coefficient K1 multiplied by the first risk Risk1. Therefore, compared with the case where the relationship between the traffic participant and the road condition is determined to be appropriate, the traveling risk R_risk can be calculated while increasing the degree of reflection of the condition of the traffic participant. As a result, the traveling risk R_risk can be appropriately estimated even under the condition that the relationship between the traffic participant and the road condition is inappropriate.

On the other hand, when it is determined that the relationship between the traffic participant and the road condition is appropriate, the first risk Risk1 is set to a value equal to or larger than the second weighting coefficient K2. Therefore, compared with the case where the relationship between the traffic participant and the road condition is determined to be inappropriate, the traveling risk R_risk can be calculated while increasing the degree of reflection of the relationship between the traffic participant and the road condition. As a result, the traveling risk R_risk can be appropriately estimated even under the condition that the relationship between the traffic participant and the road condition is appropriate.

While the second embodiment is an example in which the first risk estimation part is used to calculate the first risk Risk1 by referring to the risk map of FIG. 7, the first risk estimation part of the disclosure is not limited thereto and may be any one that estimates the first risk in the traveling direction of the own vehicle according to the relationship between the traffic participant and the road condition. For example, the first risk may be calculated by searching in a map other than the risk map shown in FIG. 7 according to the relationship between the traffic participant and the road condition, or the first risk may be calculated by a mathematical formula according to the relationship between the traffic participant and the road condition.

Further, while the second embodiment is an example in which the second risk estimation part is used to calculate the second risk Risk2 by Equations (3) and (4), the second risk estimation part of the disclosure is not limited thereto and may be any one that estimates the second risk in the traveling direction of the own vehicle according to the condition of the traffic participant. For example, the second risk may be calculated by referring to the map according to the condition of the traffic participant.

What is claimed is:

1. A risk estimation device comprising:
   a surrounding condition data acquisition part acquiring a surrounding condition data indicating a surrounding condition in a traveling direction of an own vehicle;
   a recognition part recognizing a traffic participant, a road condition, and a condition of the traffic participant in the traveling direction of the own vehicle based on the surrounding condition data;
   a reference relationship model storage part storing a reference relationship model which defines a relationship of being a reference between the traffic participant and the road condition;
   a risk model storage part storing a risk model which defines an association of a relationship between the traffic participant and the road condition with a predetermined risk;
   a relationship determination part determining whether a relationship between the recognized traffic participant and the recognized road condition is appropriate by using the reference relationship model, wherein when the relationship between the recognized traffic participant and the recognized road condition matches at least one combination of the traffic participant and the road condition in the reference relationship model, the relationship determination part determines the relationship between the recognized traffic participant and the recognized road condition as appropriate, and when mismatch, the relationship determination part determines the relationship between the recognized traffic participant and the recognized road condition as inappropriate; and a risk estimation part which estimates a risk in the traveling direction of the own vehicle by using the predetermined risk corresponding to the relationship between the traffic participant and the road condition in the risk model in a case where it is determined by the relationship determination part that the relationship between the recognized traffic participant and the recognized road condition is appropriate, and estimates the risk in the traveling direction of the own vehicle according to the condition of the traffic participant in a case where it is determined by the relationship determination part that the relationship between the recognized traffic participant and the recognized road condition is inappropriate, wherein the condition of the traffic participant includes actions of the recognized traffic participant that reflects a future intention of the recognized traffic participant, wherein the risk in the traveling direction of the own vehicle is output to a control part of the own vehicle to change movement of the own vehicle.

2. The risk estimation device according to claim 1, wherein
the relationship determination part determines that the relationship between the recognized traffic participant and the recognized road condition is inappropriate when the road condition is a pedestrian crossing in a case where the traffic participant is an automobile.

3. The risk estimation device according to claim 2, wherein
the relationship determination part determines that the relationship between the recognized traffic participant and the recognized road condition is inappropriate in a case where the automobile is oriented in an orientation that a front-rear direction of the automobile extends along an extending direction of the pedestrian crossing for crossing a road.

4. A vehicle control device comprising:
the risk estimation device according to claim 3; and
a control part, wherein when the own vehicle passes through a surrounding region of the recognized traffic participant, in a case where the relationship between the recognized traffic participant and the recognized road condition is determined to be inappropriate, the control part performs automatic operation control of the own vehicle in a manner that a deceleration of the own vehicle and a degree of avoidance with respect to the recognized traffic participant are increased compared with a case where the relationship between the recognized traffic participant and the recognized road condition is determined to be appropriate.

5. A vehicle control device comprising:
the risk estimation device according to claim 1; and
a control part, wherein when the own vehicle passes through a surrounding region of the recognized traffic participant, in a case where the relationship between the recognized traffic participant and the recognized road condition is determined to be inappropriate, the control part performs automatic operation control of the own vehicle in a manner that a deceleration of the own vehicle and a degree of avoidance with respect to the recognized traffic participant are increased compared with a case where the relationship between the recognized traffic participant and the recognized road condition is determined to be appropriate.

6. A vehicle control device comprising:
the risk estimation device according to claim 2; and
a control part, wherein when the own vehicle passes through a surrounding region of the recognized traffic participant, in a case where the relationship between the recognized traffic participant and the recognized road condition is determined to be inappropriate, the control part performs automatic operation control of the own vehicle in a manner that a deceleration of the own vehicle and a degree of avoidance with respect to the recognized traffic participant are increased compared with a case where the relationship between the recognized traffic participant and the recognized road condition is determined to be appropriate.

7. A risk estimation device comprising:
a surrounding condition data acquisition part acquiring a surrounding condition data indicating a surrounding condition in a traveling direction of an own vehicle;
a recognition part recognizing a traffic participant, a road condition, and a condition of the traffic participant in the traveling direction of the own vehicle based on the surrounding condition data;
a reference relationship model storage part storing a reference relationship model which defines a relationship of being a reference between the traffic participant and the road condition;
a relationship determination part determining whether a relationship between the recognized traffic participant and the recognized road condition is appropriate by using the reference relationship model, wherein when the relationship between the recognized traffic participant and the recognized road condition matches at least one combination of the traffic participant and the road condition in the reference relationship model, the relationship determination part determines the relationship between the recognized traffic participant and the recognized road condition as appropriate, and when mismatch, the relationship determination part determines the relationship between the recognized traffic participant and the recognized road condition as inappropriate;
a first risk estimation part estimating a first risk in the traveling direction of the own vehicle according to the relationship between the recognized traffic participant and the recognized road condition;
a second risk estimation part estimating a second risk in the traveling direction of the own vehicle according to the recognized condition of the traffic participant; and
a risk calculation part calculating a risk in the traveling direction of the own vehicle by using a weighting calculation formula including the first risk and the second risk as independent variables,
wherein in a case where it is determined by the relationship determination part that the relationship between the recognized traffic participant and the recognized road condition is inappropriate, the risk calculation part sets a weight for the second risk to a value larger than a weight for the first risk, wherein the condition of the traffic participant includes actions of the recognized traffic participant that reflects a future intention of the recognized traffic participant,
wherein the risk in the traveling direction of the own vehicle output to a control part of the own vehicle to change movement of the own vehicle.

8. The risk estimation device according to claim 7, wherein the relationship determination part determines that the relationship between the recognized traffic participant and the recognized road condition is inappropriate when the recognized road condition is a pedestrian crossing in a case where the traffic participant is an automobile.

9. The risk estimation device according to claim 8, wherein the relationship determination part determines that the relationship between the recognized traffic participant and the recognized road condition is inappropriate in a case where the automobile is oriented in an orientation that a front-rear direction of the automobile extends along an extending direction of the pedestrian crossing for corssing a road.

10. A vehicle control device comprising:

the risk estimation device according to claim 9; and a control part, wherein when the own vehicle passes through a surrounding region of the recognized traffic participant, in a case where the relationship between the recognized traffic participant and the recognized road condition is determined to be inappropriate, the control part performs automatic operation control of the own vehicle in a manner that a deceleration of the own vehicle and a degree of avoidance with respect to the recognized traffic participant are increased compared with a case where the relationship between the recognized traffic participant and the recognized road condition is determined to be appropriate.

11. A vehicle control device comprising:

the risk estimation device according to claim 7; and a control part, wherein when the own vehicle passes through a surrounding region of the recognized traffic participant, in a case where the relationship between the recognized traffic participant and the recognized road condition is determined to be inappropriate, the control part performs automatic operation control of the own vehicle in a manner that a deceleration of the own vehicle and a degree of avoidance with respect to the recognized traffic participant are increased compared with a case where the relationship between the recognized traffic participant and the recognized road condition is determined to be appropriate.

12. A vehicle control device comprising:

the risk estimation device according to claim 8; and a control part, wherein when the own vehicle passes through a surrounding region of the recognized traffic participant, in a case where the relationship between the recognized traffic participant and the recognized road condition is determined to be inappropriate, the control part performs automatic operation control of the own vehicle in a manner that a deceleration of the own vehicle and a degree of avoidance with respect to the recognized traffic participant are increased compared with a case where the relationship between the recognized traffic participant and the recognized road condition is determined to be appropriate.

* * * * *